United States Patent [19]
Higashi

[11] Patent Number: 5,931,038
[45] Date of Patent: Aug. 3, 1999

[54] METHOD OF MACHINING BORE SURFACE OF CYLINDER BLOCK AND APPARATUS THEREFOR

[75] Inventor: Toshio Higashi, Toyota, Japan

[73] Assignee: Toyota Jidosha Kabushiki Kaisha, Toyota, Japan

[21] Appl. No.: 08/999,261

[22] Filed: Dec. 29, 1997

[30] Foreign Application Priority Data

Feb. 25, 1997 [JP] Japan .................................. 9-040886

[51] Int. Cl.⁶ .................................................. B21D 53/84
[52] U.S. Cl. ........................ 72/70; 72/370.01; 29/898.13; 123/193.2
[58] Field of Search ............................. 29/898.02, 898.1, 29/898.13; 72/370.17, 370.08, 370.06, 370.01, 123, 122, 118, 70; 123/193.2

[56] References Cited

U.S. PATENT DOCUMENTS

| | | | |
|---|---|---|---|
| 1,422,655 | 7/1922 | Brehmer | 29/898.1 |
| 2,645,954 | 7/1953 | Pfingston | 72/118 |
| 4,004,441 | 1/1977 | Leszak | 72/123 |
| 4,539,832 | 9/1985 | Koller | 72/118 |
| 5,339,523 | 8/1994 | Hasegawa | 72/370.06 |

FOREIGN PATENT DOCUMENTS

| | | |
|---|---|---|
| 57-61953 | 12/1982 | Japan . |
| 59-58172 | 4/1984 | Japan . |
| 5-57597 | 3/1993 | Japan . |
| 7-75958 | 3/1995 | Japan . |
| 7-91311 | 4/1995 | Japan . |

*Primary Examiner*—Lowell A. Larson
*Attorney, Agent, or Firm*—Oliff & Berridge, PLC

[57] ABSTRACT

In a method of machining a surface of a bore of an aluminum cylinder block for internal combustion engines, the bore surface is machined to be formed with a number of recesses which are to be formed into oil reservoirs. The bore surface is then pressed uniformly to be plastically deformed so that each recess is narrow at its opening and broad in its inner part. The machining for formation of the recesses and the working for plastic deformation for narrowing the opening are combined together so that the bore surface is machined to have oil reservoir recesses each of which is narrow at its opening and broad at its inner part.

21 Claims, 5 Drawing Sheets

METHOD OF MACHINING BORE SURFACE OF CYLINDER BLOCK AND APPARATUS THEREFOR

BACKGROUND OF THE INVENTION

1. Field of the Invention

This invention relates to a technique for machining a surface of a bore of an engine cylinder block so that the bore surface is formed with a number of fine recesses.

2. Description of the Prior Art

A surface of a bore provided in a cylinder block for an internal combustion engine is preferably formed to be smooth so that friction between a piston ring and the bore surface is reduced. On the other hand, the bore surface is preferably formed with a number of fine oil reservoirs for reserving engine oil on the bore surface so that an oil film is ensured between the piston ring and the bore surface.

Japanese Laid-Open Patent Publication No. 5-57597 discloses an efficient method of machining such a bore surface as described above. In the disclosed method, the bore surface is machined by a honing machine provided with a honing stick made from abrasive grains each having a predetermined roughness. As the result of honing, a large number of fine streaks are formed on the bore surface to be further formed into oil reservoirs. Although this method provides an efficient formation of the oil reservoirs, the formed oil reservoirs have a low oil reserving capability. More specifically, each of the streaks 3 formed by the honing has a bore surface side opening 3a which is wider than an inner part 3z, as typically shown in an enlarged view of FIG. 3. This wider opening 3a results in a problem that each oil reservoir has the low oil reserving capability.

In order that the oil reserving capability of the oil reservoirs may be improved, the bore surface side opening 3a of the oil reservoir 3 is desired to be rendered narrower than the inner part 3z. An opening width of the oil reservoir 3 is usually fine, ranging between 4 μm and 5 μm. A sealing performance between upper and lower chambers of a piston is reduced when the opening width of the oil reservoir 3 exceeds the range. Accordingly, it is difficult to render the bore surface side opening narrower than the inner part by ordinary machining methods. Under these circumstances, an electrochemical machining is employed to form oil reservoirs 3 as typically shown in an enlarged view of FIG. 1(C). A bore surface side opening of each oil reservoir formed by the electrochemical machining is narrower than the inner part and accordingly, each oil reservoir has an improved oil reserving capability.

However, the electrochemical machining requires a longer machining time. Furthermore, waste fluid resulting from the electrochemical machining needs to be treated or otherwise, disposed of. These drawbacks increase the manufacturing cost of the cylinder block.

SUMMARY OF THE INVENTION

Therefore, an object of the present invention is to realize a novel machining technique for efficiently forming, on the bore surface, oil reservoirs in each of which a bore surface side opening is narrower than an inner part so that each oil reservoir has an improved oil reserving capability.

Another object of the invention is to realize a novel machining method wherein the bore surface is machined so that the oil reservoirs each having the bore surface side opening narrower than the inner part can be formed.

Other objects of the present invention will become clear upon reviewing the following description of the preferred embodiments thereof and claims, made with reference to the accompanying drawings.

In one aspect, the present invention provides a method of machining a bore surface of a cylinder block, comprising the steps of machining the bore surface so that the bore surface is formed with a number of recesses, and pressing the bore surface formed with the recesses, thereby reducing a bore surface side opening of each recess and smoothing the bore surface.

According to the above-described method, machining the bore surface can form the oil reservoirs each having the bore surface side opening narrower than the inner part and accordingly an improved oil reserving capability. Consequently, the bore surface can efficiently be finished by machining.

The step of forming the recesses on the bore surface is accomplished by honing the bore surface by the use of a grindstone made from abrasive grains each having a predetermined roughness, for example. In this case, the groove-like recesses are formed. Alternatively, the recesses are formed on the bore surface by pressing a plurality of protrusions against the bore surface. In this case, the recesses are formed in the shape of dots.

In another aspect, the invention provides an apparatus for machining a bore surface of a cylinder block, comprising means for machining the bore surface so that the bore surface is formed with a number of recesses thereon, and means for pressing the bore surface formed with the recesses, thereby reducing a bore surface side opening of each recess and smoothing the bore surface.

In further another aspect, the invention provides an apparatus for machining a bore surface of a cylinder block, comprising a roller inserted into the bore, means for pressing the roller against the bore surface, and means for helically moving the roller along the bore surface. In this construction, the roller includes, in an order from an inserted end side, a first finishing surface for finishing the bore surface so that the bore surface has a predetermined surface roughness, a recess forming surface for forming recesses on the bore surface, the recess forming surface having a plurality of protrusions, and a second finishing surface for reducing a bore surface side opening of each recess and smoothing the bore surface.

According to the above-described apparatus, the machining method of the invention can be carried out readily and efficiently.

Various features and advantages of the present invention will become clear upon reviewing the following description of the preferred embodiments thereof and claims, made with reference to the accompanying drawings.

DETAILED DESCRIPTION OF THE PREFERRED EMBODIMENTS

A first embodiment of the present invention will be described with reference to FIGS. 1 to 5. The first embodiment is directed to a method of forming oil reservoirs on a bore surface of an aluminum cylinder block. A honing machine and a roller burnishing machine are used in the method. These machines will first be described.

Figure 1:
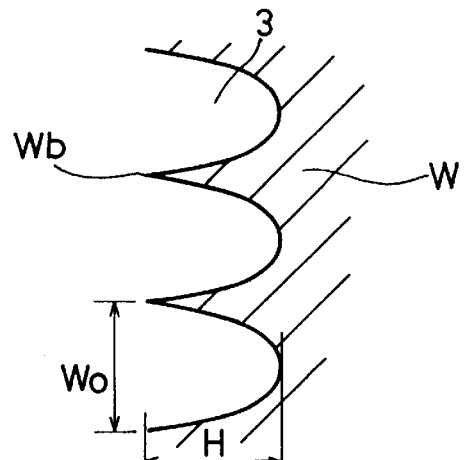
FIGS. 1(A) to 1(C) illustrate steps of the method of forming the bore surface of a cylinder block in accordance with a first embodiment of the present invention.
Figure 1:
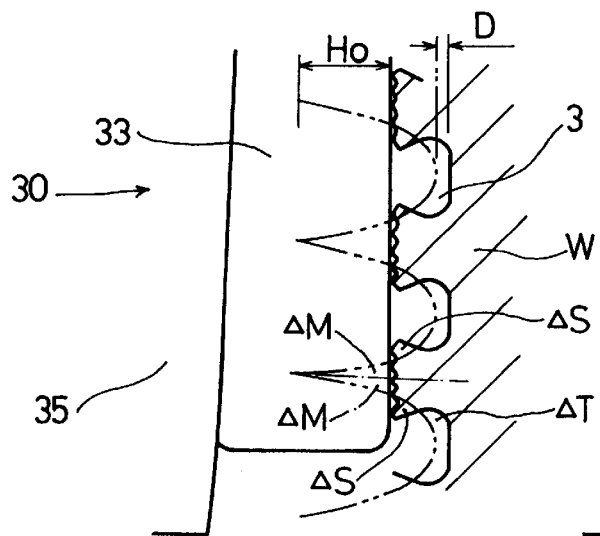
Figure 1:
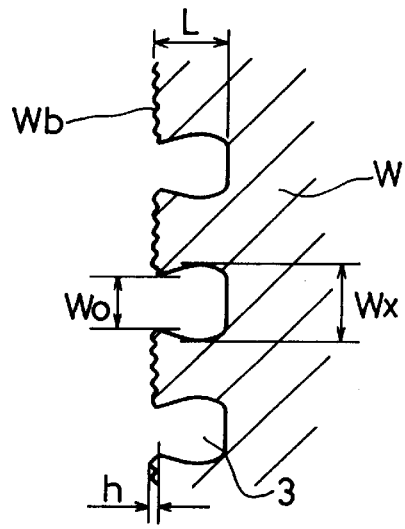
Figure 2:
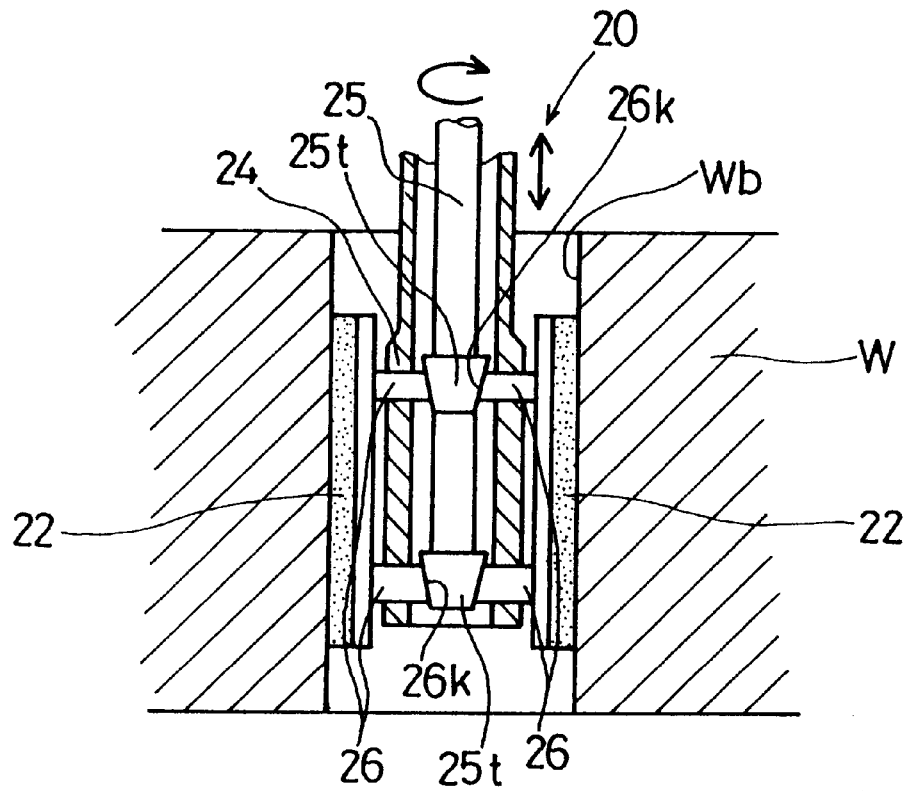
FIG. 2 is a partial longitudinal section of a honing machine used in the method of the first embodiment.

A honing machine 20 is provided with a pair of bar-shaped grindstones or honing sticks 22. The bar-shaped grindstones 22 are pressed against a bore surface wb of a cylinder block w, and a grinding fluid is poured with the grindstones 22 being rotated and reciprocally moved simultaneously, whereby the bore surface wb is ground, as shown in FIG. 2. Each bar-shaped grindstone 22 is constituted by abrasive grains each having a predetermined roughness and has an outer peripheral surface which is formed into the shape of a circular arc conforming to the bore surface wb.

The honing machine 22 further comprises a substantially cylindrical rotational shaft 24 coupled to a spindle (not shown) thereof. The rotational shaft 24 is held to be rotatable about its axis and to be axially movable. The rotational shaft 24 accommodates therein a coaxially disposed push rod 25 axially displaceable relative to the rotational shaft 24 by means of a hydraulic cylinder (not shown).

The push rod 25 has a pair of inverted conical taper cones 25t coaxially formed at predetermined positions thereon. A pair of racks 26 support the respective bar-shaped grindstones 22 and extend horizontally. The racks 26 have inclined faces 26k in contact with the taper cones 25t in a face-to-face relation, respectively. Each rack 26 is movably supported in the horizontal state by the rotational shaft 24. Accordingly, the racks 26 are displaced radially outward by cooperation of the tapered cones 25t and the inclined faces 26k when the hydraulic cylinder pushes the push rod 25 downward relative to the rotational shaft 24 held to be coaxial with a cylinder bore, respectively. Consequently, the racks 26 exert a predetermined pressing force on the bar-shaped grindstones 22 so that the grindstones 22 are pressed against the bore surface wb of the cylinder block w. In this state, the rotational shaft 24 is rotated and reciprocally moved axially with the grinding fluid being poured, whereby the bore surface wb is ground.

As shown in FIGS. 4(A) and 4(B), the roller burnishing machine 30 comprises five rollers 33 rolled on the bore surface wb, pressed thereagainst, thereby finishing the bore surface wb. The roller burnishing machine 30 further comprises a substantially cylindrical rotational shaft 34 coupled to a spindle (not shown) thereof. The rotational shaft 34 is held to be rotatable about its axis and to be axially movable. A distal end of the rotational shaft 34 is formed with five circumferentially equally spaced longitudinal holes 34h. The rollers 33 are longitudinally accommodated in the holes 34h to be rotatable and movable radially with respect to the rotational shaft 34 respectively.

The rotational shaft 34 accommodates therein a coaxially disposed shaft-like mandrel 35 axially displaceable relative to the rotational shaft 34 by means of a hydraulic cylinder (not shown). The mandrel 35 has a gently tapered outer circumferential surface 35r with which outer circumferential surfaces 33r of the rollers 33 are in line contact. The outer circumferential surface 33r of each roller 33 is tapered. The taper of each roller 33 is in the opposite direction to that of the mandrel 35 and has a gradient equal to that of the mandrel 35. By the action of the taper of each roller 33, the outer circumferential surface 33r of each roller 33 in contact with the bore surface wb is held parallel to an axis of the roller burnishing machine 30.

Each roller 33 is displaced radially outward by the action of the taper of the mandrel 35 when the hydraulic cylinder pushes the mandrel 35 downward relative to the rotational shaft 34 held to be coaxial with a cylinder bore. Consequently, the outer circumferential surface 33r of each roller 33 is brought into line contact with the bore surface wb, thereby exerting a predetermined pressing force on the bore surface wb to press it. In this state, when the rotational shaft 34 is rotated and reciprocally moved axially simultaneously, the bore surface wb is continuously pressed uniformly by the rollers 33, whereby the bore surface wb is burnished. Since each roller 33 has an exceedingly smoothly finished surface, the bore surface wb is smoothed by the burnishing.

Figure 3:
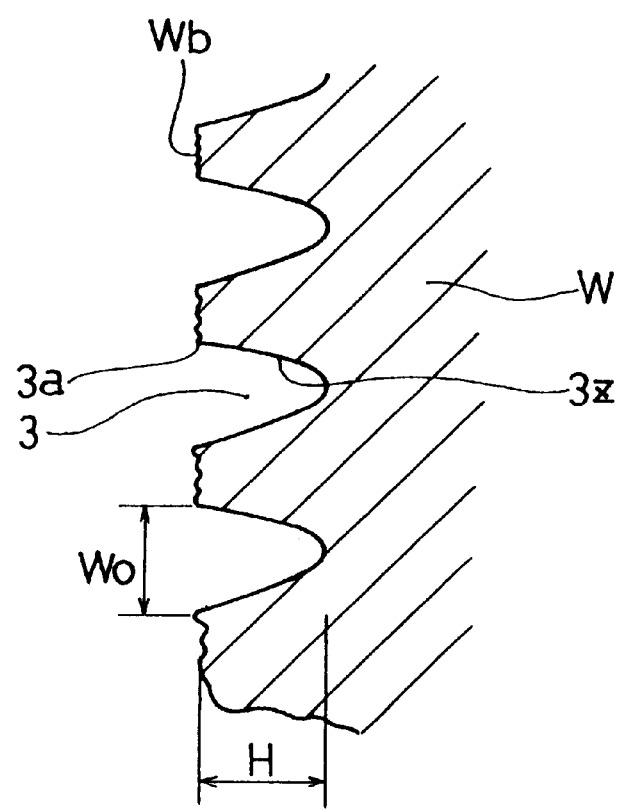
FIG. 3 is an enlarged sectional view of streaks (groove-like recesses) formed by the honing machine shown in FIG. 2.
Figure 4:
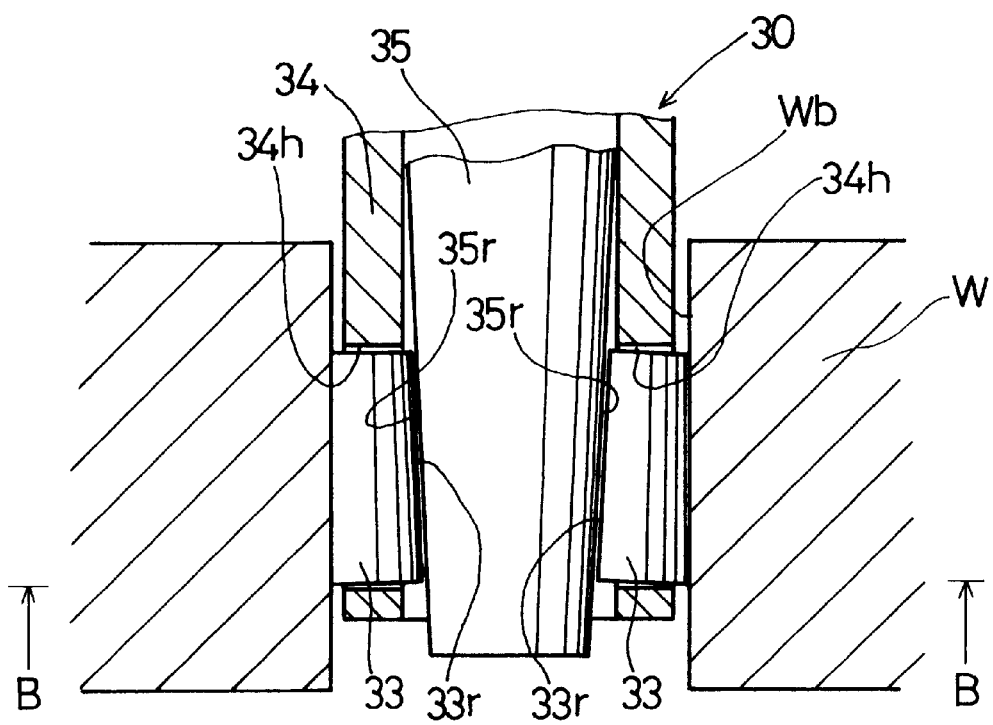
FIG. 4(A) is a partial longitudinal section of a roller burnishing machine used in the method of the first embodiment.
FIG. 4(B) is a view as viewed in the direction of arrow B in FIG. 4(A)
Figure 4:
Figure 4:
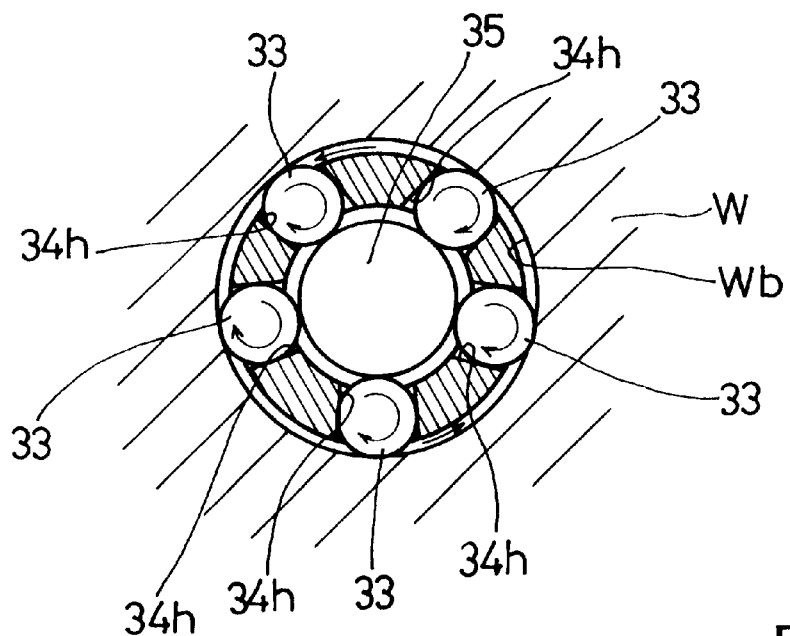

The bore surface machining method of the embodiment will now be described. First, the bore surface wb of the cylinder block w is ground by the honing machine 20. More specifically, the bar-shaped grindstones 22 are pressed against the bore surface wb, and the grinding fluid is poured with the grindstones 22 being rotated and reciprocally moved simultaneously, whereby the bore surface wb is ground, as shown in FIG. 2. The bore surface wb is finished to have a predetermined surface roughness and formed with fine streaks (groove-like recesses) 3 as shown in enlarged views of FIGS. 1(A) and 3 when the bore surface wb is ground by helically moving the bar-shaped grindstones 22 along the bore surface in a manner as described above. Referring to FIGS. 1(A) and 3, a depth and a width of each streak depend upon the roughness of abrasive grains constituting each grindstone 22 and the grinding conditions. In view of a capacity of each oil reservoir recess to be finally formed, the roughness of abrasive grains and the grinding conditions are set so that the depth H and the opening width WO of each streak 3 are about 8 $\mu$m and about 5 $\mu$m respectively. FIG. 1(A) shows high densely formed streaks 3, whereas FIG. 3 shows relatively sparsely formed streaks.

Figure 5:
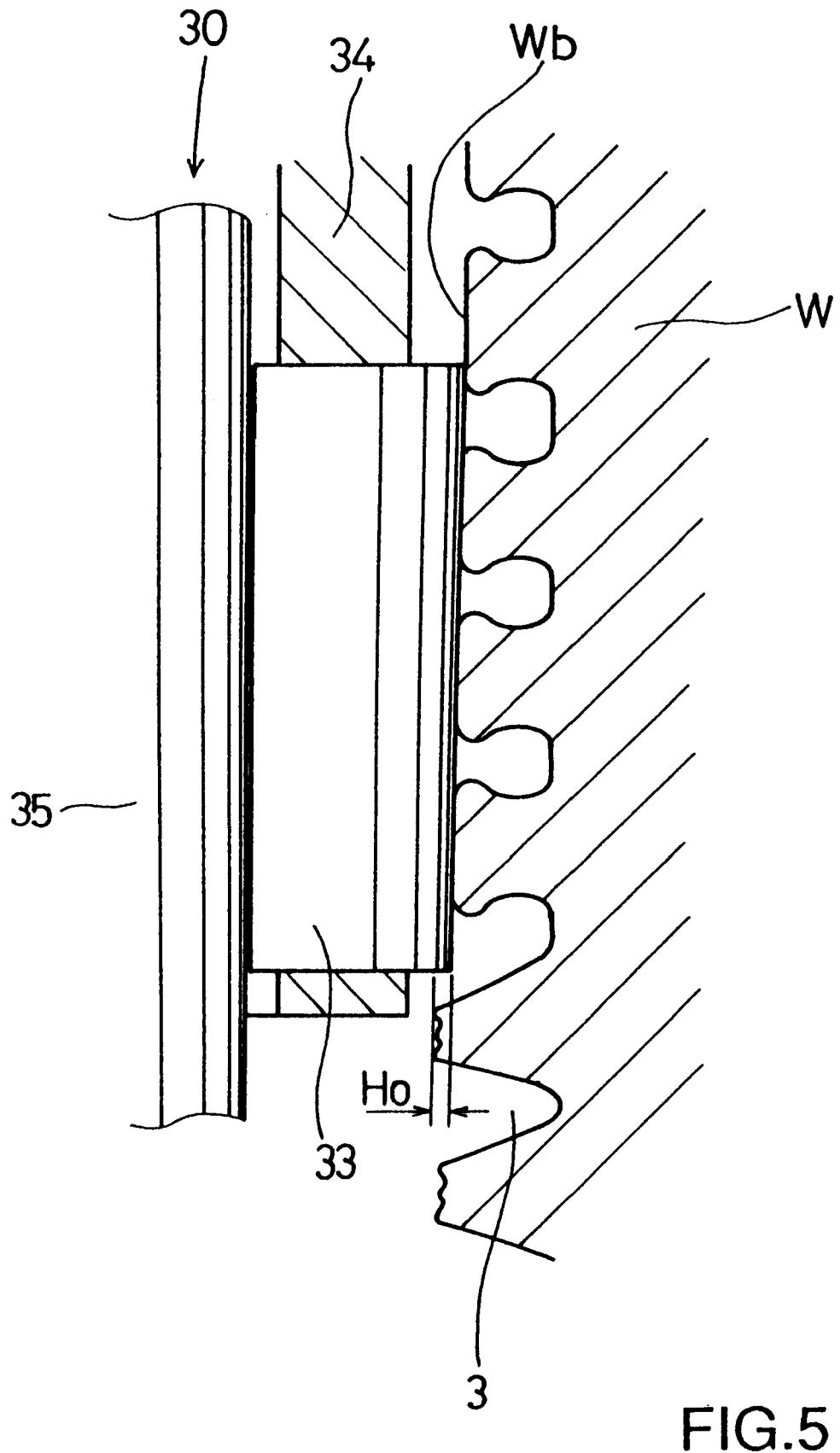
FIG. 5 is an enlarged sectional view of streaks (groove-like recesses) plastically deformed by the roller burnishing machine.

The bore surface wb formed with the fine streaks by the grinding is then burnished by the roller burnishing machine 30, as shown in FIG. 5. In the embodiment, an amount of burnish HO (FIG. 1(B)) of the burnishing machine 30 or squeeze of the bore surface wb is set for 6 $\mu$m. When each roller 33 is rolled, pressed against the bore surface wb of the cylinder block w by a predetermined pressing force, ridges of the streaks 3 are collapsed about 6 $\mu$m as shown in FIG. 1(B). Since only the streaks 3 are enlarged in FIGS. 1(B) and 5, a reduction scale of the rollers 33 does not agree with one of the streaks 3.

When the ridge of each streak 3 is collapsed, the material of one side $\Delta M$ of the ridge is caused to flow so as to narrow an opening of the streak 3, thereby forming an overhang $\Delta S$. Furthermore, a trough $\Delta T$ of the streak 3 is forced into the wall surface. Consequently, the width WO of the bore surface side opening of each streak 3 is narrowed from about 5 $\mu$m to about 4 $\mu$m, and a width WX of the trough (inner part) of each streak 3 is broadened from about 4 $\mu$m to about 5 $\mu$m. Furthermore, each streak 3 is sunk about 1 $\mu$m in its entirety.

The burnishing is carried out as described above, and the machining of the bore surface wb is completed when the rollers 33 are departed from the bore surface wb of the cylinder block w. Upon completion of the machining, the bore surface wb returns slightly inward due to the elasticity of the aluminum such that the inner diameter thereof is reduced about 5 $\mu$m. FIG. 1(C) shows this state of bore surface wb. In FIG. 1(C), each streak 3 has the bore surface side opening width WO of about 4 $\mu$m, the inner part width WX of about 5 $\mu$m, and the depth L of about 4 $\mu$m. The surface roughness of the part of the bore surface wb other than the oil reservoirs depends upon the degree of finishing of surface of each roller 33. A height h of concavity and convexity resulting from the roughness of surface of each roller 33 usually have a height ranging between 0.5 $\mu$m and 1 $\mu$m.

According to the foregoing embodiment, the honing and the burnishing are combined together so that the oil reservoir recess having a narrow opening and a wide inner part is formed. Consequently, since the electrochemical machining required in the prior art is not necessitated, the machining time can be reduced and the manufacturing cost of the cylinder block can be reduced.

Second Embodiment

Figure 6:
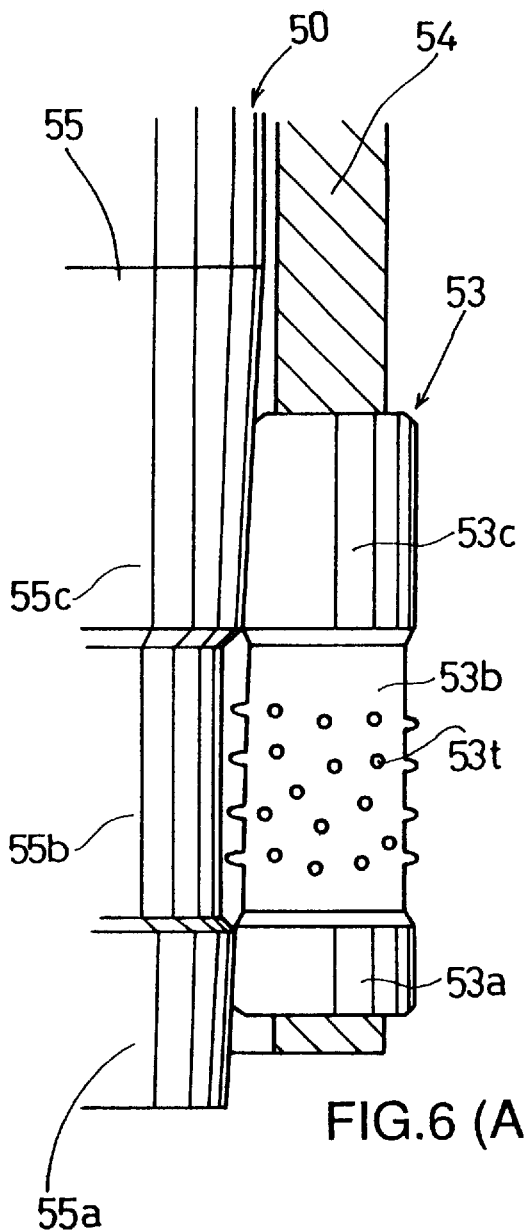
FIGS. 6(A) to 6(C) illustrate the method of machining the bore surface of the cylinder block and an apparatus therefor in accordance with a second embodiment of the invention.
Figure 6:
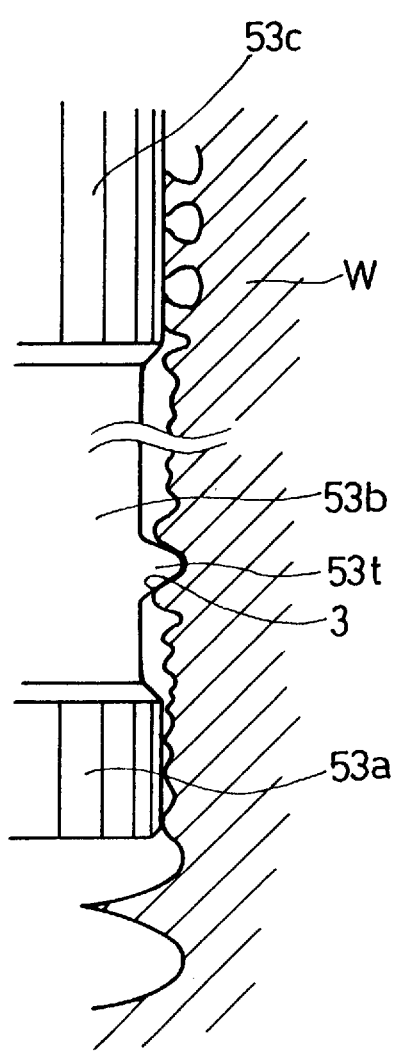
Figure 6:
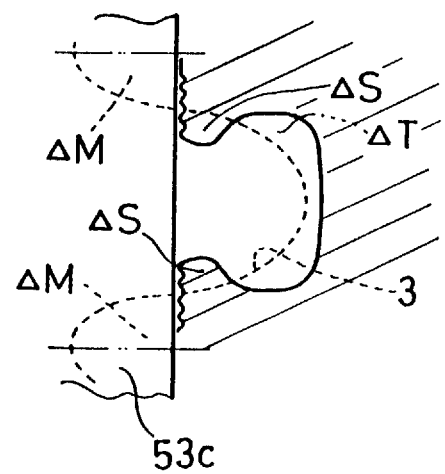

The machining method and apparatus therefor in a second embodiment will be described with reference to FIGS. 6(A) to 6(C). In the second embodiment, the rollers 33 and the mandrel 35 of the roller burnishing machine 30 used in the first embodiment are modified so that both forming the recesses and smoothing the bore surface can be carried out by a single machine.

A roller burnishing machine 50 used in the second embodiment includes rollers 53 each formed with a first finishing surface 53a, a recess forming surface 53b, and a second finishing surface 53c in the order from its distal end. The first and second finishing surfaces 53a and 53c are used to burnish the bore surface wb. For this purpose, the first and second finishing surfaces 53a and 53c are finished to be exceedingly smooth. The recess forming surface 53b has a diameter smaller by a predetermined value than the first and second finishing surfaces 53a and 53c. The recess forming surface 53b has a plurality of protrusions 53t for forming oil reservoir recesses 3 in the shape of dots on the bore surface wb. Each protrusion 53t has a distal end protruding radially outward by a predetermined distance farther than the first and second finishing surfaces 53a and 53c. The distal end of each protrusion 53t has a volume determined on the basis of a capacity of each oil reservoir recess 3.

A mandrel 55 of the roller burnishing machine 50 has an outer circumferential surface formed with a first pressing surface 55a, a concave surface 55b, and a second pressing surface 55c in the order from its distal end. The first and second pressing surfaces 55a and 55c are adapted to come into line contact with the first and second finishing surfaces 53a and 53c of the roller 53 respectively. The concave surface 55b of the mandrel 55 has an outer diameter so set that the protrusions 53t of the roller 53 do not come into contact with the concave surface 55b.

The bore surface machining method of the second embodiment will now be described with reference to FIGS. 6(B) and 6(C). First, the cylinder block is positioned so that the cylinder bore is held coaxially with the rotational shaft 54 of the roller burnishing machine 50 and so that the first finishing surface 53a of each roller 53 is inserted into the bore. When the mandrel 55 is lowered in this state, the first finishing surface 53a of each roller 53 comes into line contact with the bore surface wb of the cylinder block w to exert a predetermined pressing force on the bore surface wb, thereby pressing it.

The rotational shaft 54 is then rotated, lowered, so that the bore surface wb is continuously pressed uniformly by the first finishing surface 53a to thereby be regulated to have a predetermined surface roughness. The bore surface wb thus regulated by the first finishing surface 53a is continuously pressed by the recess forming surface 53b successively so that a plurality of recesses 3 are formed by the action of the protrusions 53t in the shape of dots on the bore surface wb. Since the protrusions 53t are forced against the bore surface wb to form the recesses 3 thereon, the material of the cylinder block is caused to swell around each recess 3 as shown by $\Delta$M in FIG. 6(C).

The bore surface wb pressed by the recess forming surface 53 is successively pressed uniformly by the second finishing surface 53c. As the result of pressing by the second finishing surface 53c, a swollen portion $\Delta$M around the opening of each recess 3 is pressed to be collapsed by the second finishing surface 53c so that the material is caused to flow so as to narrow the opening of each recess 3, thereby forming an overhang $\Delta$S. Furthermore, the trough $\Delta$T of each recess 3 is forced into the wall surface. Consequently, the bore surface wb is formed with a plurality of oil reservoir recesses 3 in the shape of dots, each of which recesses 3 has a narrowed opening and a broadened inner part.

Upon completion of the pressing by the second finishing surface 53c of each roller 53, the bore surface wb returns slightly inward due to the elasticity of the aluminum as in the first embodiment, and the machining of the bore surface wb is completed. Upon completion of the machining, the mandrel 55 is raised and the rollers 53 are retracted radially inward. In this state, the rotational shaft 54 is drawn out upward.

According to the above-described bore surface machining method, the recesses 3 each having a narrowed opening and a broadened inner part are formed by a single machine. Since the electrochemical machining required in the prior art is not necessitated, an equipment cost and a machining time can be reduced. Furthermore, the number and size of the oil reservoir recesses 3 can optionally be determined on the basis of the number and size of the protrusions 53t formed on the recess forming surface 53b.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

What is claimed is:

1. A method of machining a bore surface of a cylinder block, comprising the steps of:
   machining the bore surface so that the bore surface is formed with a number of recesses; and
   pressing the bore surface formed with the recesses, thereby reducing a bore surface side opening of each recess to less than about 5 microns and smoothing the bore surface.

2. The method according to claim 1, wherein the bore surface is honed by a grindstone made from abrasive grains each having a predetermined roughness in the recess forming step.

3. The method according to claim 2, wherein the grindstone is helically moved along the bore surface.

4. The method according to claim 1, wherein a plurality of protrusions are pressed against the bore surface in the recess forming step.

5. The method according to claim 4, wherein a roller having the plurality of protrusions is rolled along the bore surface in the recess forming step.

6. The method according to claim 5, wherein the roller is helically moved along the bore surface.

7. The method according to claim 1, further comprising the step of machining the bore surface so that the bore surface has a predetermined surface roughness, prior to the recess forming step.

8. The method of claim 1, wherein the bore surface side opening of each recess is between about 4 and 5 microns.

9. The method of claim 1, wherein the bore surface side opening of each recess is about 4 microns, an inner part width of each recess is about 5 microns and a depth of each recess is about 4 microns.

10. The method of claim 1, wherein the bore surface side opening of each recess is narrower than an inner part of the recess.

11. An apparatus for machining a bore surface of a cylinder block, comprising:

means for machining the bore surface so that the bore surface is formed with a number of recesses thereon; and means for pressing the bore surface formed with the recesses, thereby reducing a bore surface side opening of each recess to less than about 5 microns and smoothing the bore surface.

12. An apparatus according to claim 11, wherein the recess forming means includes a grindstone.

13. An apparatus according to claim 11, wherein the recess forming means includes protrusions pressed against the bore surface.

14. The apparatus of claim 11, wherein the bore surface side opening of each recess is between about 4 and 5 microns.

15. The apparatus of claim 11, wherein the bore surface side opening of each recess is about 4 microns, an inner part width of each recess is about 5 microns and a depth of each recess is about 4 microns.

16. The apparatus of claim 8, wherein the bore surface side opening of each recess is narrower than an inner part of the recess.

17. An apparatus for machining a bore surface of a cylinder block, comprising:

a roller inserted into the bore;

means for pressing the roller against the bore surface; and means for helically moving the roller along the bore surface;

wherein the roller includes, in an order from an inserted end side:

a first finishing surface for finishing the bore surface so that the bore surface has a predetermined surface roughness;

a recess forming surface for forming recesses on the bore surface, the recess forming surface having a plurality of protrusions; and a second finishing surface for reducing a bore surface side opening of each recess to less than about 5 microns and smoothing the bore surface.

18. The apparatus of claim 17, wherein the bore surface side opening of each recess is between about 4 and 5 microns.

19. The apparatus of claim 17, wherein the bore surface side opening of each recess is about 4 microns, an inner part width of each recess is about 5 microns and a depth of each recess is about 4 microns.

20. The apparatus of claim 17, wherein the bore surface side opening of each recess is narrower than an inner part of the recess.

21. A method of forming oil reservoirs in a smooth cylinder block bore surface comprising the steps of:

forming a plurality of recesses in the smooth cylinder block bore surface, each recess having a recess opening; and pressing the cylinder block bore surface to reduce the recess openings to less than about 5 microns.

* * * * *